(12) United States Patent
Matsuda et al.

(10) Patent No.: US 11,982,971 B2
(45) Date of Patent: May 14, 2024

(54) DRIVE DEVICE AND IMAGE FORMING APPARATUS INCORPORATING THE DRIVE DEVICE

(71) Applicants: Naoki Matsuda, Kanagawa (JP); Yutaka Naitoh, Kanagawa (JP)

(72) Inventors: Naoki Matsuda, Kanagawa (JP); Yutaka Naitoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/095,131

(22) Filed: Jan. 10, 2023

(65) Prior Publication Data

US 2023/0244172 A1 Aug. 3, 2023

(30) Foreign Application Priority Data

Jan. 31, 2022 (JP) .................................. 2022-013614

(51) Int. Cl.
| | |
|---|---|
| *G03G 21/16* | (2006.01) |
| *F16H 57/021* | (2012.01) |
| *G03G 21/18* | (2006.01) |
| G03G 15/00 | (2006.01) |
| G03G 15/20 | (2006.01) |

(52) U.S. Cl.
CPC ....... *G03G 21/1647* (2013.01); *F16H 57/021* (2013.01); *G03G 15/2032* (2013.01); *G03G 15/2064* (2013.01); *G03G 15/5008* (2013.01); *G03G 21/1864* (2013.01); *G03G 2221/1657* (2013.01)

(58) Field of Classification Search
CPC ........... G03G 21/1647; G03G 15/5008; G03G 2221/1657; G03G 15/757; G03G 21/1857; F16H 57/021
See application file for complete search history.

(56) References Cited

U.S. PATENT DOCUMENTS

| | | | |
|---|---|---|---|
| 2010/0232848 A1 | 9/2010 | Naitoh | |
| 2014/0341613 A1* | 11/2014 | Ishida | G03G 21/1647 399/167 |
| 2015/0344809 A1 | 12/2015 | Kabata et al. | |
| 2015/0345614 A1 | 12/2015 | Kabata et al. | |
| 2016/0170361 A1 | 6/2016 | Matsuda et al. | |

(Continued)

FOREIGN PATENT DOCUMENTS

| | | | | |
|---|---|---|---|---|
| JP | 2014-089358 | | 5/2014 | |
| JP | 2018-123951 | | 8/2018 | |
| JP | 2019139118 A | * | 8/2019 | ............. B65H 5/062 |

*Primary Examiner* — Bobby Rushing, Jr.
(74) *Attorney, Agent, or Firm* — Duft & Bornsen, PC

(57) ABSTRACT

A drive device includes a drive source, a drive train including a plurality of drive transmitters, and a positioning member. The drive train transmits a driving force of the drive source to a driven member. The plurality of drive transmitters include a first group of the drive transmitters and a second group of the drive transmitters. The drive source and the first group of the drive transmitters together serve as an integrated unit attached to one side of a facing member facing a side panel of an image forming apparatus. The integrated unit includes a positioning object. The second group of the drive transmitters is supported by a shaft disposed on another side of the facing member. The positioning member includes a positioning portion with which the positioning object is engaged on the one side or said another side of the facing member.

11 Claims, 12 Drawing Sheets

(56) References Cited

U.S. PATENT DOCUMENTS

| | | |
|---|---|---|
| 2016/0221772 A1 | 8/2016 | Ishida et al. |
| 2018/0224779 A1* | 8/2018 | Tomita ............... G03G 15/2032 |
| 2018/0237723 A1 | 8/2018 | Kabata et al. |
| 2020/0125022 A1 | 4/2020 | Matsuda |
| 2020/0233364 A1* | 7/2020 | Shimizu ............. G03G 21/1857 |
| 2021/0033171 A1 | 2/2021 | Matsuda |

* cited by examiner

DRIVE DEVICE AND IMAGE FORMING APPARATUS INCORPORATING THE DRIVE DEVICE

CROSS-REFERENCE TO RELATED APPLICATION

This patent application is based on and claims priority pursuant to 35 U.S.C. § 119(a) to Japanese Patent Application No. 2022-013614, filed on Jan. 31, 2022, in the Japan Patent Office, the entire disclosure of which is hereby incorporated by reference herein.

BACKGROUND

Technical Field

Embodiments of the present disclosure relate to a drive device and an image forming apparatus incorporating the drive device.

Background Art

Drive devices in the related art are known to include a drive source and a drive train including drive transmitters to transmit a driving force of the drive source, to a driven member.

A known drive device includes two speed reducers, which are a worm gear and a planetary gear mechanism, in the drive train, contains the drive train in a housing serving as a container, and attach the housing to a motor holder that holds a drive motor integrated as a single unit. Multiple drive transmitters constituting the drive train are supported by a fixed shaft or a rotary shaft supported by the motor holder.

SUMMARY

Embodiments of the present disclosure described herein provide a novel drive device including a drive source, a drive train including a plurality of drive transmitters, and a unit positioning member. The drive train including the plurality of drive transmitters transmits a driving force of the drive source to a driven member. The plurality of drive transmitters includes a first group of the drive transmitters and a second group of the drive transmitters. The drive source and the first group of the drive transmitters together serve as an integrated unit attached to one side of a facing member facing a side panel of an image forming apparatus, the integrated unit including a positioning object. The second group of the drive transmitters is supported by a shaft disposed on another side of the facing member. The unit positioning member includes a positioning portion with which the positioning object is engaged on the one side or said another side of the facing member.

Further, embodiments of the present disclosure described herein provide an image forming apparatus including the above-described drive device.

BRIEF DESCRIPTION OF THE SEVERAL VIEWS OF THE DRAWINGS

Exemplary embodiments of this disclosure will be described in detail based on the following figures, wherein.

Figure 1:
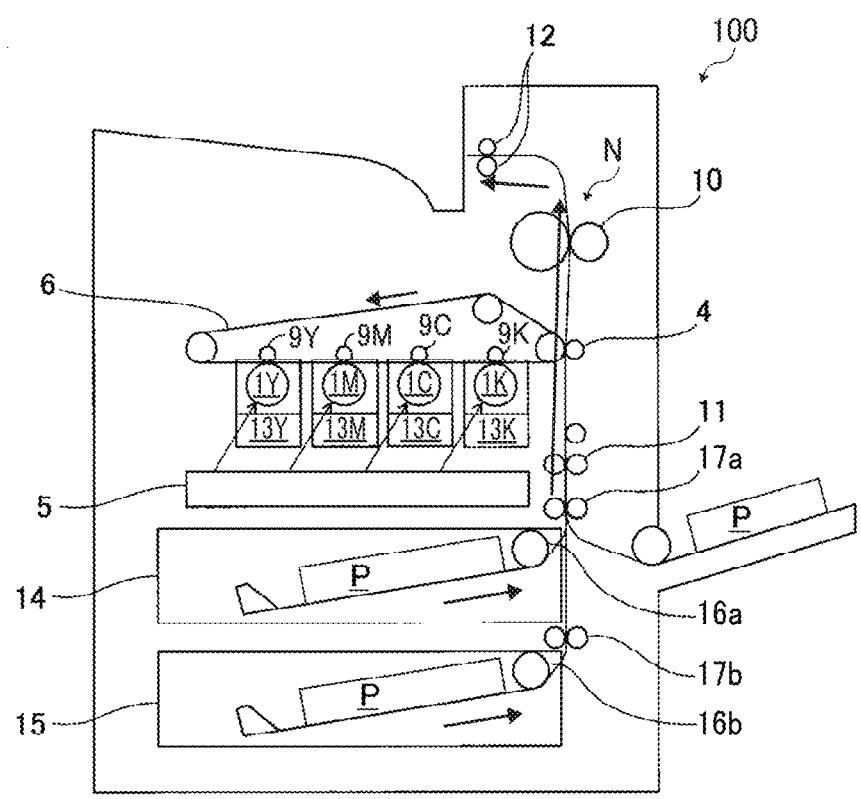
FIG. 1 is a schematic view of an image forming apparatus in its entirety, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, a detailed description is given of an embodiment of the present disclosure with reference to the drawings.

FIG. 1 is a schematic view of an image forming apparatus in its entirety, according to an embodiment of the present disclosure.

In FIG. 1, a color printer 100 serving as an image forming apparatus according to the present embodiment includes process cartridges 13Y, 13M, 13C, and 13K aligned in a row at substantially the center of the frame of the color printer 100. The suffixes Y, M, C, and K are appropriately omitted. The color printer 100 further includes an exposure device 5 and sheet trays (sheet feeders) 14 and 15. The exposure device 5 is disposed below the process cartridges 13Y, 13M, 13C, and 13K to form a latent image on photoconductor drums 1Y, 1M, 1C, and 1K each serving as an image bearer. The sheet trays 14 and 15 serving as sheet feeders are disposed below the exposure device 5 to stack and contain a sheet P serving as a recording medium. The color printer 100 further includes an intermediate transfer belt 6 and primary transfer rollers 9Y, 9M, 9C, and 9K. The intermediate transfer belt 6 serving as an intermediate transferor is disposed above the process cartridges 13Y, 13M, 13C, and 13K. The primary transfer rollers 9Y, 9M, 9C, and 9K are disposed inside the endless loop of the intermediate transfer belt 6 and disposed facing the photoconductor drums 1Y, 1M, 1C, and 1K, respectively, via the intermediate transfer belt 6. The color printer 100 also includes a secondary transfer roller pair 4 and a fixing device 10. The secondary transfer roller pair 4 is disposed at a right side end of the intermediate transfer belt 6 to collectively transfer a toner image formed by overlaying the images on the intermediate transfer belt 6, onto the sheet P. The fixing device 10 is disposed above the secondary transfer roller pair 4 to fix the toner image transferred on the sheet P to the sheet P. Further, the color printer 100 further includes a sheet ejection roller pair 12 serving as a sheet ejection member is disposed at the portion obliquely upper left of the fixing device 10 to convey the sheet P to be ejected outside the color printer 100.

As a print job is issued in the color printer 100 having the above-described configuration, the sheet P stacked in the sheet tray 14 or the sheet tray 15 fed by sheet feed rollers 16a and 16b. The sheet P is then conveyed in the vertical direction of the color printer 100 in FIG. 1, via conveyance roller pairs 17a and 17b and a registration roller pair 11. At this time, the toner image is sequentially conveyed from the photoconductor drums 1Y, 1M, 1C, and 1K of the respective colors to the intermediate transfer belt 6 in the horizontal direction in FIG. 1 in an intermediate transfer process. In synchrony with arrival of the leading end of the sheet P to the secondary transfer roller pair 4, the leading end of the toner image on the intermediate transfer belt 6 also reaches the secondary transfer roller pair 4, so that the toner image is collectively transferred onto the sheet P in a secondary transfer process. Since the unfixed toner image on the sheet P is easily peeled off from the sheet P, the sheet P is conveyed to the fixing device 10 to fix the toner image on the sheet P by application of heat and pressure. The sheet P having the fixed toner image is ejected by the sheet ejection roller pair 12 to the outside of the color printer 100.

In the above-described fixing device 10, when a relatively thin sheet P such as an envelope passes through a nip region N and a relatively large pressure force is applied from the pressure roller 19 to the relatively thin sheet P, wrinkles or twists are likely to occur on the sheet P. On the other hand, when a relatively thick sheet P passes through the nip region N with pressure force that is applied when a relatively thin sheet P passes through the nip region N, the sheet P is ejected with the toner image remaining unfixed since the pressure is too small to sufficiently fix the toner image to the sheet P. When a paper jam (or a jam) occurs while a sheet is jammed in the nip region N of the fixing device 10, the pressure force of the pressure roller 19 that is a pressure fixing member as a second rotator needs to be released (no pressure applied) in order to remove the jammed sheet.

In order to handle such a situation, the fixing device 10 of the color printer 100 according to the present embodiment includes a pressure adjustment mechanism serving as a pressure force adjuster to control the pressing amount of the pressure roller 19 to the fixing roller 18 to adjust the pressure force. The pressure adjustment mechanism changes the position of the pressure roller 19 to the fixing roller 18 serving as a pressed member. By so doing, the pressure force is adjusted.

Figure 2:
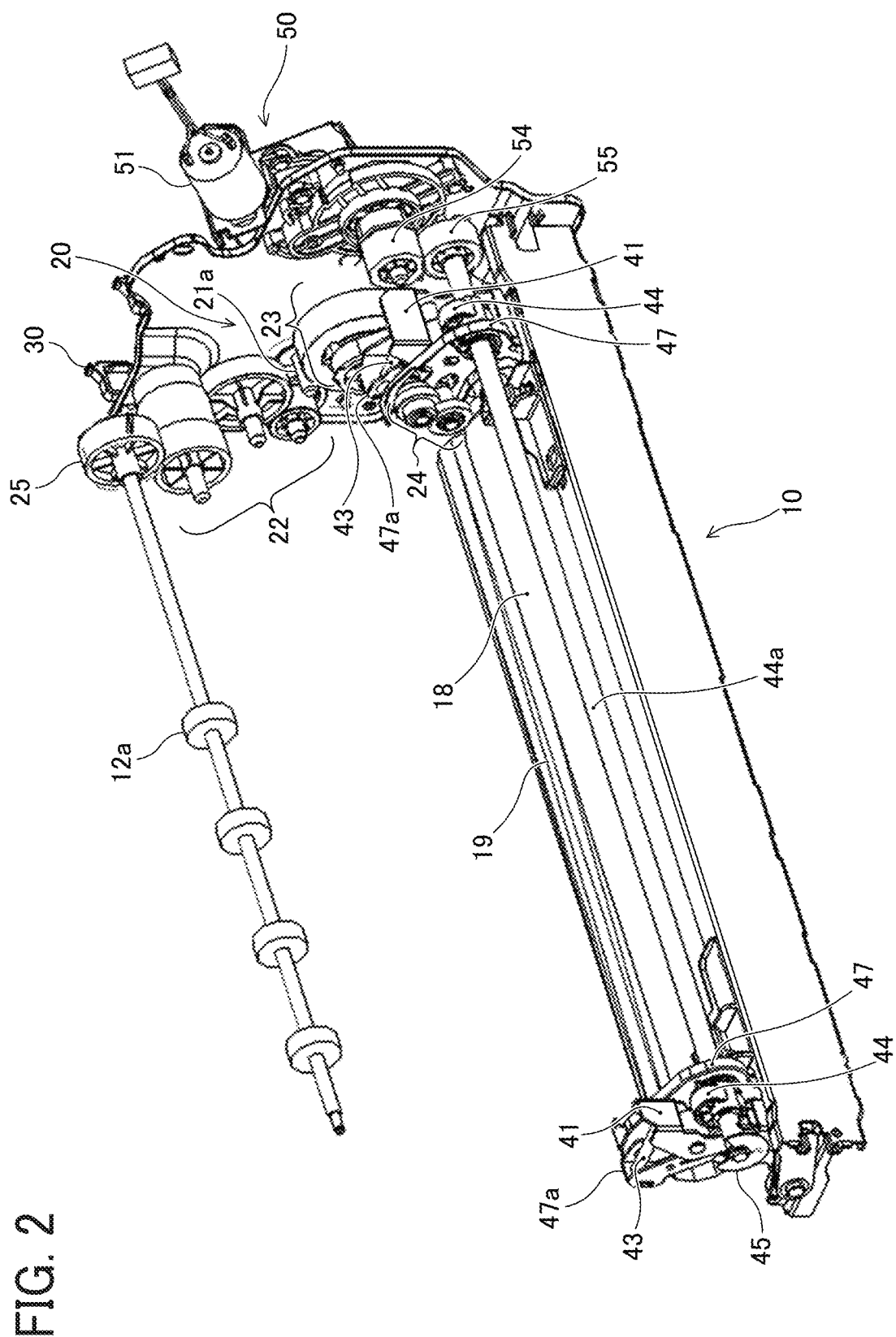
FIG. 2 is a perspective view of a fixing device and a drive device that drives the components around the fixing device, according to an embodiment of the present disclosure.

FIG. 2 is a perspective view of the fixing device 10 and a drive device that drives the components around the fixing device 10.

Figure 3:
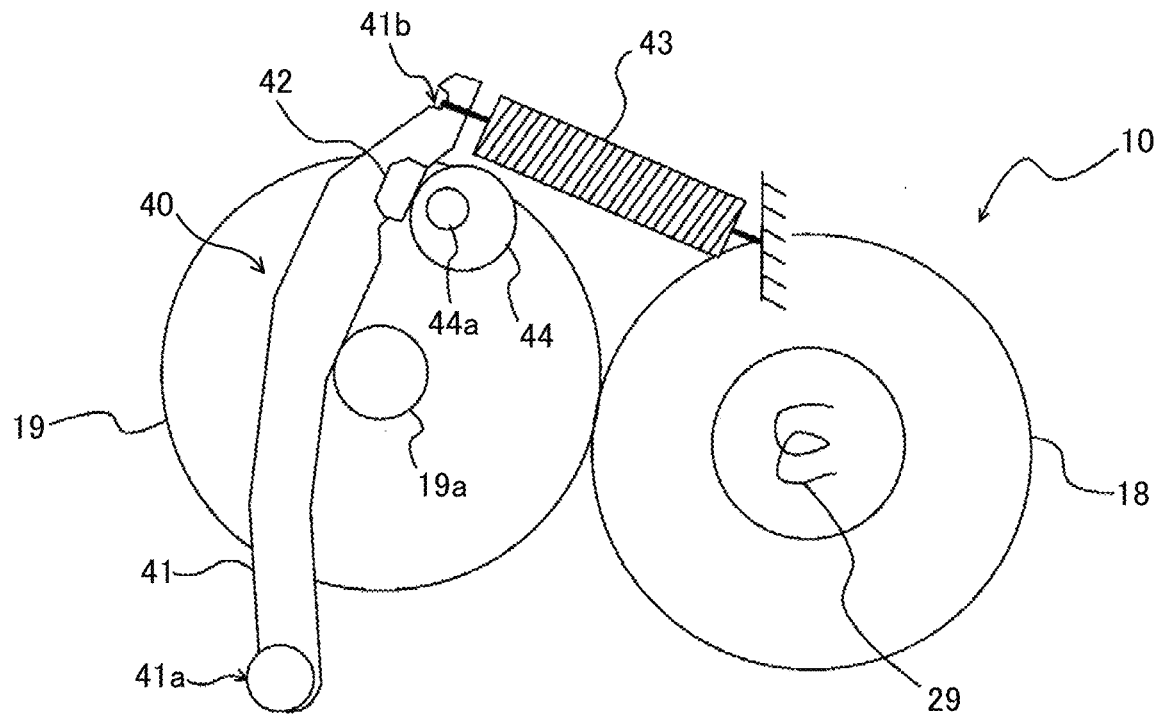
FIG. 3 is a diagram illustrating a main configuration of the fixing device, according to an embodiment of the present disclosure.

FIG. 3 is a diagram illustrating a main configuration of the fixing device 10.

The fixing device 10 includes the fixing roller 18 and the pressure roller 19. The fixing roller 18 includes an infrared heater 29 inside and serves as a pressed member to be heated by the infrared heater 29. The pressure roller 19 serves as a moving member that presses the fixing roller 18 to form the fixing nip region between the fixing nip and the pressure roller 19. The fixing device 10 further includes a pressure adjustment mechanism 40 that moves the pressure roller 19 to the fixing roller 18 to adjust the pressure force of the pressure roller 19 to the fixing roller 18. The pressure adjustment mechanism 40 separates the pressure roller 19 from the fixing roller 18, so as to cancel the pressure force. The pressure adjustment mechanism 40 includes a pair of levers 41 and a pair of springs 43. The pair of levers 41 adjustably supports the pressure force of the pressure roller 19 to the fixing roller 18. The pair of springs 43 serves as a biasing force applier that applies the biasing force to the pressure roller 19 toward the fixing roller 18 via the pair of levers 41. The pressure adjustment mechanism 40 further includes cams 44 in pair and a pressure drive device 50. The cams 44 move the pressure roller 19 in the direction to separate from the fixing roller 18 via the pair of levers 41 against the biasing force of the pair of springs 43. The pressure drive device 50 drives the cams 44.

The fixing roller 18 is rotatably supported by a pair of side plates 47 on both sides in the axial direction of the fixing roller 18. Both axial ends of the shaft 19a of the pressure roller 19 are rotatably supported by the pair of levers 41 of the pressure adjustment mechanism 40. As illustrated in FIG. 3, a support shaft 41a is mounted on one end of each of the pair of levers 41 and is rotatably supported by the pair of side plates 47. A spring bearing 41b is mounted on the opposed end of each of the pair of levers 41. One end of the pair of springs 43 that functions as a biasing force applier is attached to the spring bearing 41b. As illustrated in FIG. 2, the other end of each of the pair of springs 43 is attached to a spring bearing 47a mounted on each of the pair of side plates 47. A cam bearing 42 is formed on the other end of each of the pair of levers 41. Each of the cams 44 serving as a driven member contacts the cam bearing 42.

The cams 44 in pair are mounted on a cam shaft 44a so that the cams 44 rotate together with the cam shaft 44a as a single unit. A cam gear 55 is mounted at the far end (i.e., the right side end in FIG. 2) of the cam shaft 44a, so that the cam gear 55 that meshes with an output gear 54 of the pressure drive device 50 rotates together with the cam shaft 44a as a single unit.

A feeler 45 is mounted at the near end (i.e., the left side end in FIG. 2) of the cam shaft 44a, so that the feeler 45 that detects the angle of rotation of the cams 44 rotates together with the cam shaft 44a as a single unit. The feeler 45 is detected by an optical sensor to detect the angle of rotation of the cams 44. The feeler 45 has a cutout portion. The optical sensor is a photointerrupter (a transmission optical sensor).

In the process of rotation of the cam shaft 44a, as the cam shaft 44a reaches a given position of angle of rotation, the feeler 45 is moved to a gap formed between a light emitting element and a light receiving element of the optical sensor to block or shield an optical path formed between a light emitting element and a light receiving element of the optical sensor. As the cam shaft 44a rotates by a given angle from the above-described state, the feeler 45 is removed from the gap between the light emitting element and the light receiving element of the optical sensor. Accordingly, the light receiving element of the optical sensor receives light emitted by the light emitting element. In response to receipt of light from the light emitting element, the light receiving element of the optical sensor sends a light receiving signal to a controller. The controller grasps the position of angle of rotation of a projection of each of the cams 44 that are fixed to the cam shaft 44a, based on the timing at which the light receiving signal from the light receiving element is lost and the amount of driving force of a pressure motor 51 from the timing.

Further, a drive bracket 30 is disposed on the far side of the apparatus (i.e., the right side end in FIG. 2), and a fixed-sheet ejection drive device 20 as another drive device to rotate the pressure drive device 50, the fixing roller 18, and a sheet ejection drive roller 12a is disposed on the drive bracket 30.

Figure 11:
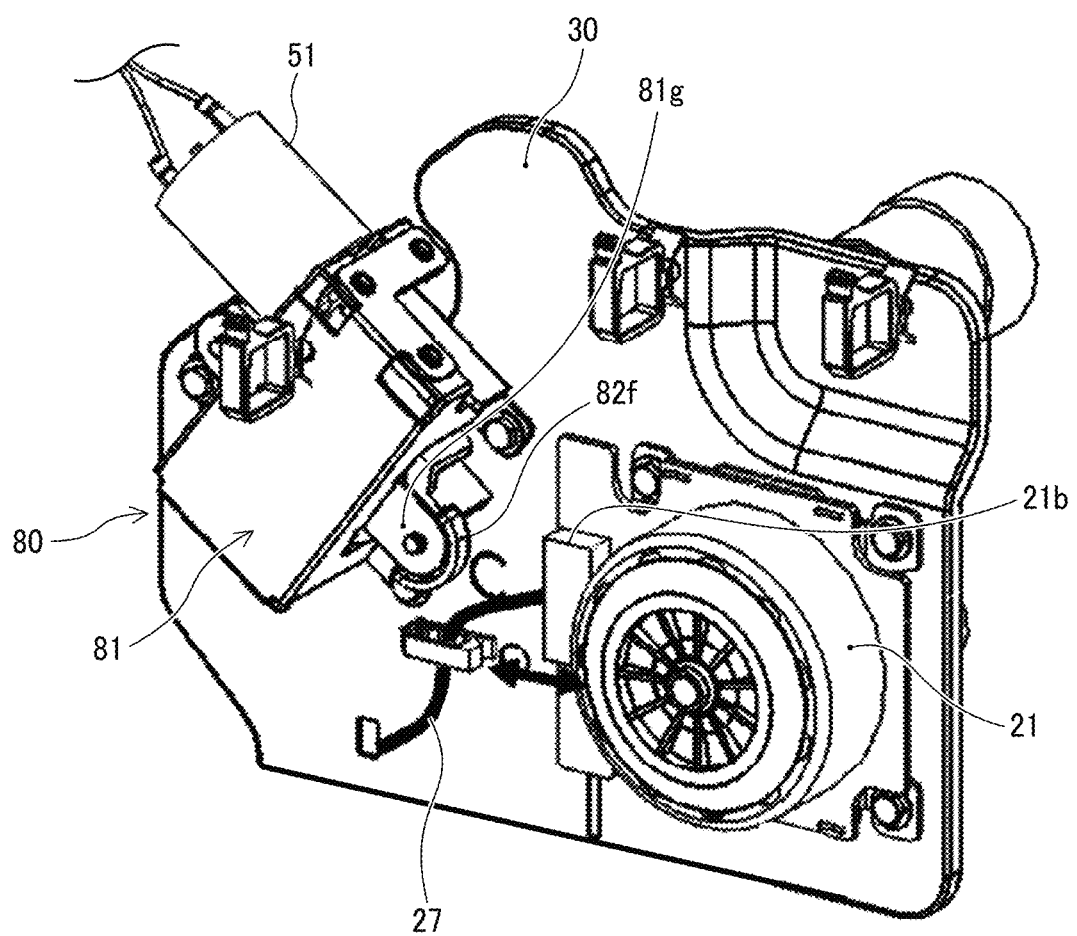
FIG. 11 is a perspective view of the drive bracket as viewed from the side where the pressure motor unit is attached, according to an embodiment of the present disclosure.

The fixed-sheet ejection drive device 20 includes a fixed-sheet ejection motor 21 serving as a drive source (see FIG. 11). The fixed-sheet ejection motor 21 is attached to the face of the drive bracket 30 opposite to the fixing device 10. In other words, the fixed-sheet ejection motor 21 is arranged outside in the axial direction, so that a motor shaft 21a passes through the drive bracket 30. A plurality of gears constituting a sheet ejection drive train 22 and gears and pulleys constituting a fixing drive train 23 are rotatably supported on an inner face of the drive bracket 30.

A motor gear directly mounted on the motor shaft 21a is meshed with an input gear of the sheet ejection drive train 22 and an input gear of the fixing drive train 23. The driving force applied by the fixed-sheet ejection motor 21 is transmitted to a sheet ejection gear 25 that is mounted on the far end of the rotary shaft of the sheet ejection drive roller 12a via the sheet ejection drive train 22, so that the sheet ejection drive roller 12a rotates. The driving force of the fixed-sheet ejection motor 21 is transmitted to a drive train 24 of the fixing device 10 via the fixing drive train 23. The drive train 24 of the fixing device 10 includes multiple gears mounted on the rear panel of the fixing device 10. Then, the driving force of the fixed-sheet ejection motor 21 is transmitted to the fixing roller 18 via the drive train 24 of the fixing device 10, so that the fixing roller 18 rotates.

Figure 4:
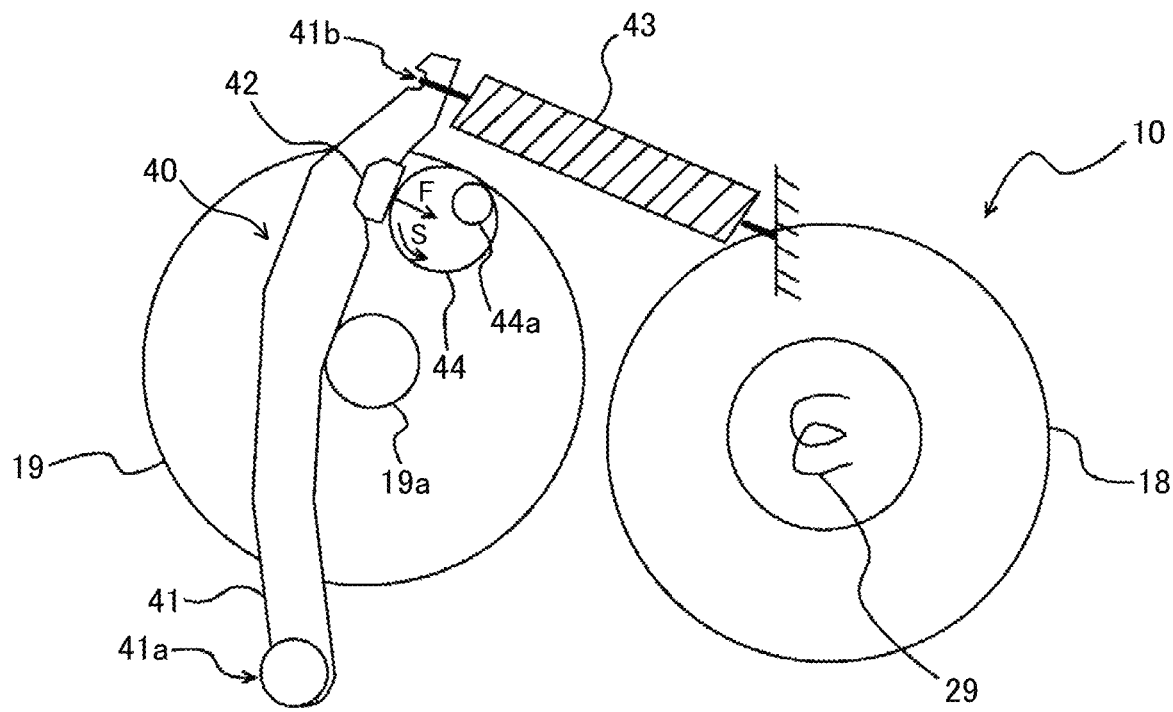
FIG. 4 is a diagram illustrating a pressure roller moving from a non-pressing position to a pressing position.

FIG. 4 is a diagram illustrating the pressure roller 19 moving from a non-pressing position to a pressing position.

In the present embodiment, if a paper jam occurs in the fixing device 10, the pressure adjustment mechanism 40 separates the pressure roller 19 from the fixing roller 18, so as to change to the position of the pressure roller 19 to the non-pressing position (no pressure force) between the fixing roller 18 and the pressure roller 19, as illustrated in FIG. 4. More specifically, the pressure motor 51 of the pressure drive device 50 is driven to rotate the cams 44 in the rotational direction S. By so doing, the cams 44 in the state as illustrated in FIG. 3 presses the cam bearing 42 in FIG. 3, against the biasing force F applied by the pair of springs 43. According to this action, the pair of levers 41 rotates around the support shaft 41a as a fulcrum in a counterclockwise direction in FIG. 3. Then, the pressure roller 19 serving as a moving member moves in a direction away from the fixing roller 18. By so doing, the pressure roller 19 is separated from the fixing roller 18 as illustrated in FIG. 4. As a result, a sheet or sheets jammed in the fixing nip region can be removed from the fixing nip region easily.

Further, when the color printer 100 serving as an image forming apparatus is changed from a standby state to a sleep mode or when the power source is turned off, the pressure adjustment mechanism 40 reduces the pressure force of the pressure roller 19 to the fixing roller 18, thereby preventing occurrence of creep in the fixing nip region. Further, when a thick paper such as an envelope is conveyed, the pressure adjustment mechanism 40 reduces the pressure force of the pressure roller 19 to the fixing roller 18. By so doing, a fixing operation can be performed without causing creases in the thick paper.

When the pressure roller 19 is moved in the direction to be separated from the fixing roller 18 against the biasing force of the springs 43, a relatively large load torque is applied to the cams 44. To drive and rotate the cams 44 against the load torque, the pressure motor needs to have a relatively large drive torque. However, a motor having a large drive torque is relatively large in size and is expensive, which is likely to increase the size and cost of the apparatus.

To address this inconvenience, the pressure drive device 50 includes two speed reducers, which are a planetary gear mechanism and a worm gear, in the drive train to transmit the driving force of the pressure motor 51 to the cams 44. By so doing, a relatively large reduction ratio is obtained to significantly enhance the output torque to be output to the cams 44. Due to such a configuration, even when the pressure motor 51 employs a relatively small torque, the output torque to be output to the cams 44 is greater than the load torque to be applied when the pressure roller 19 is moved in the direction to be separated from the fixing roller 18 against the biasing force of the springs 43. As a result, a compact and less expensive drive source having a relatively small torque can be used as the pressure motor 51, and an increase in size and cost of the apparatus can be prevented.

Figure 5:
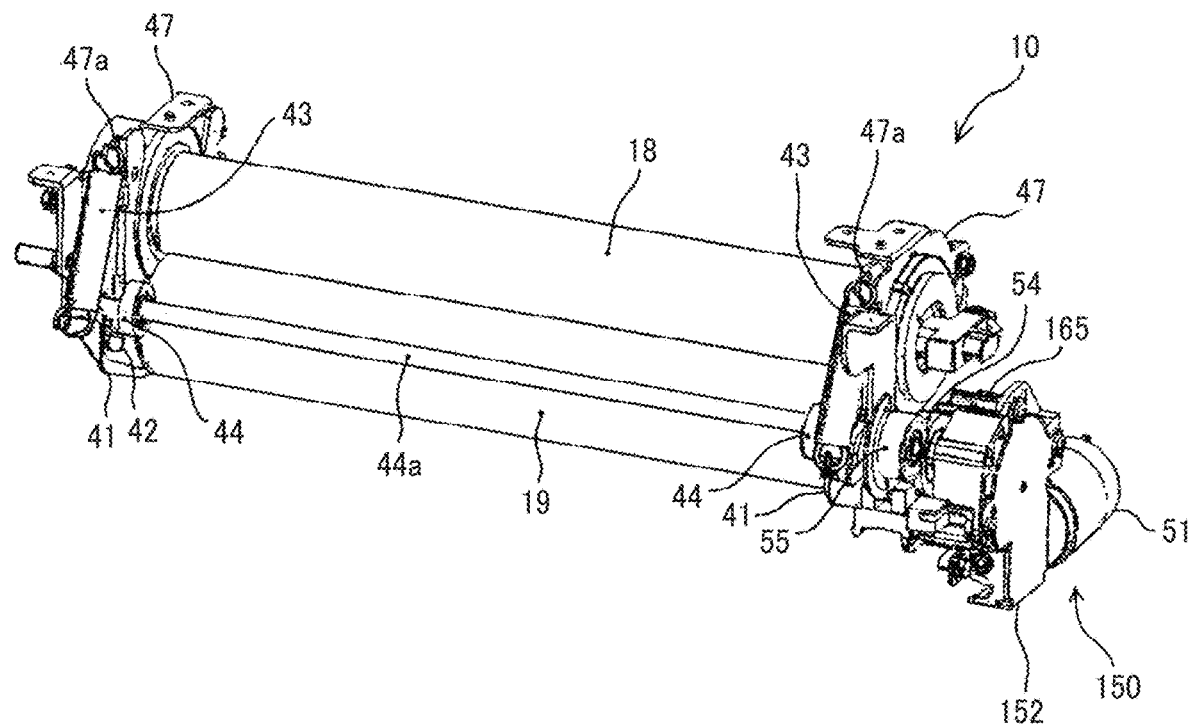
FIG. 5 is a perspective view of a known pressure drive device and a fixing device.

FIG. 5 is a perspective view of a known pressure drive device 150 and the fixing device 10.

As illustrated in FIG. 5, the pressure drive device 150 includes a drive train provided with two speed reducers, which are a planetary gear mechanism and a worm gear. The drive train of the pressure drive device 150 is contained in a housing 165 and a drive device holder 152 that holds the pressure motor 51. In the manner described above, the pressure motor 51 and the drive train are integrated as a single unit and are attached to the printer. In the present embodiment, to achieve a reduction in size of the image forming apparatus, the distance between the drive bracket 30 serving as a facing member and a rear panel serving as a side panel of the image forming apparatus is relatively narrow. The rear panel is disposed between the drive bracket 30 and the fixing device 10 to support the drive bracket 30.

However, as a result of narrowing the gap between the drive bracket 30 and the rear panel, the pressure drive device 150 that is integrated as a single unit could not be disposed in the space between the rear panel and the drive bracket 30. To address this inconvenience, in the present embodiment, the drive train of the pressure drive device is divided into two, so that the pressure drive device can be disposed by effectively utilizing the space between the drive bracket 30 and the rear panel and the space between the drive bracket 30 and the exterior cover of the printer. A detailed description is given below of the pressure drive device 50 according to the present embodiment.

Figure 6:
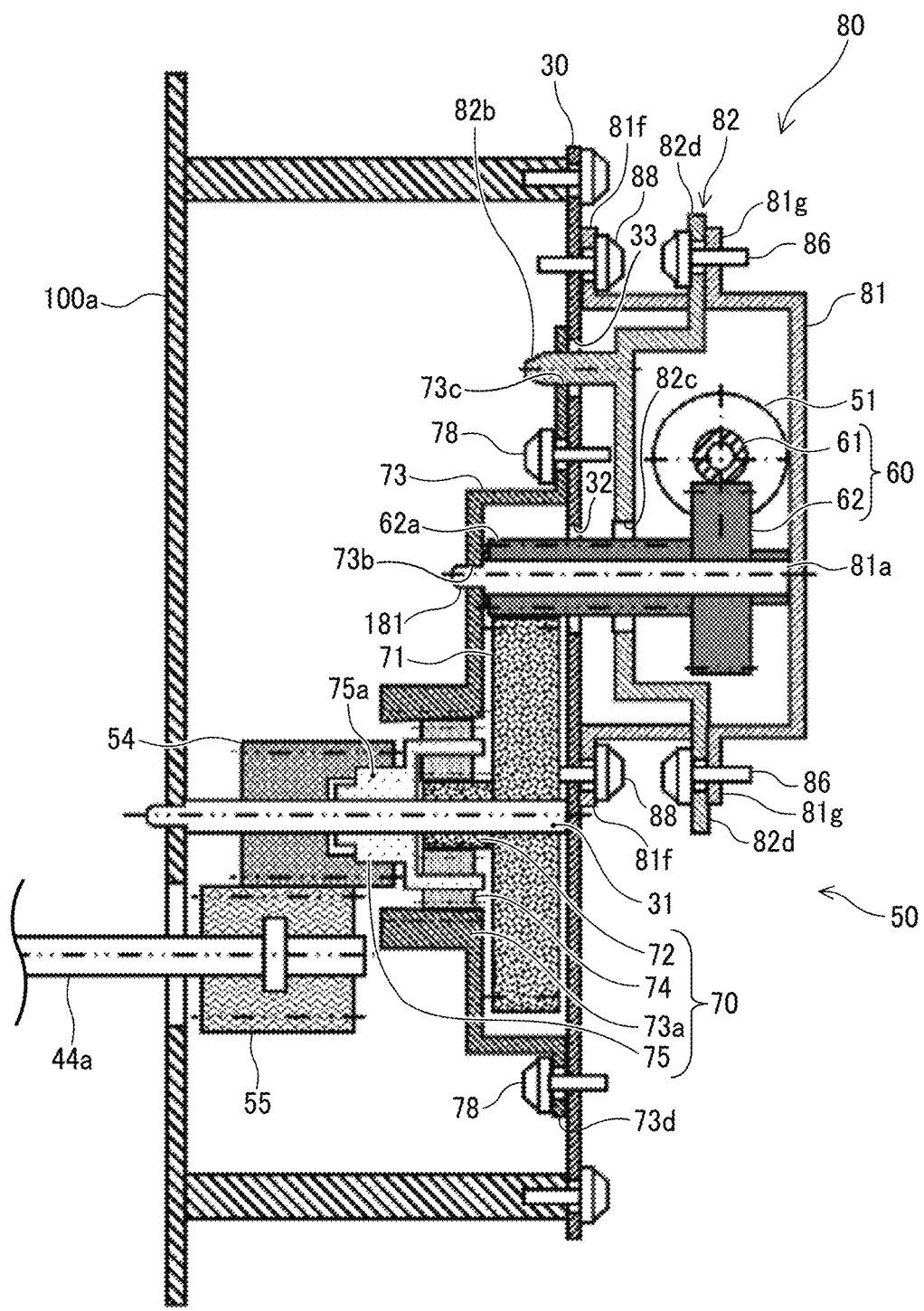
FIG. 6 is a schematic view of a pressure drive device according to an embodiment of the present disclosure.

FIG. 6 is a schematic view of the pressure drive device 50 according to the present embodiment.

Figure 7:
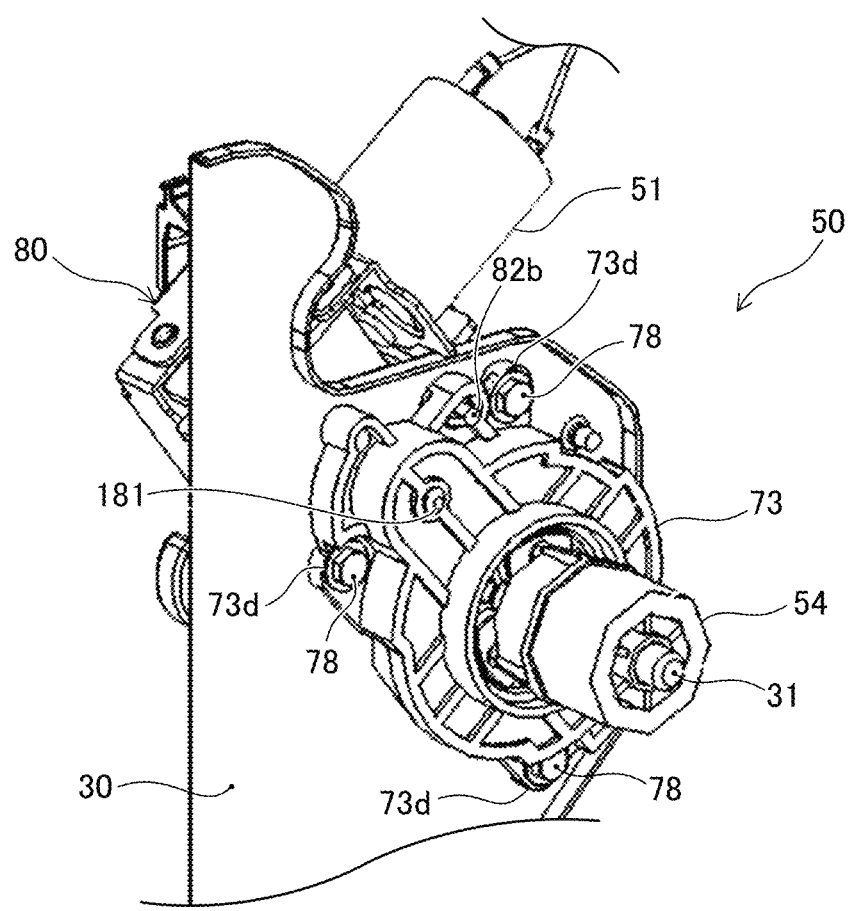
FIG. 7 is a perspective view of the pressure drive device of FIG. 6.

FIG. 7 is a perspective view of the pressure drive device 50 according to the present embodiment.

Figure 8:
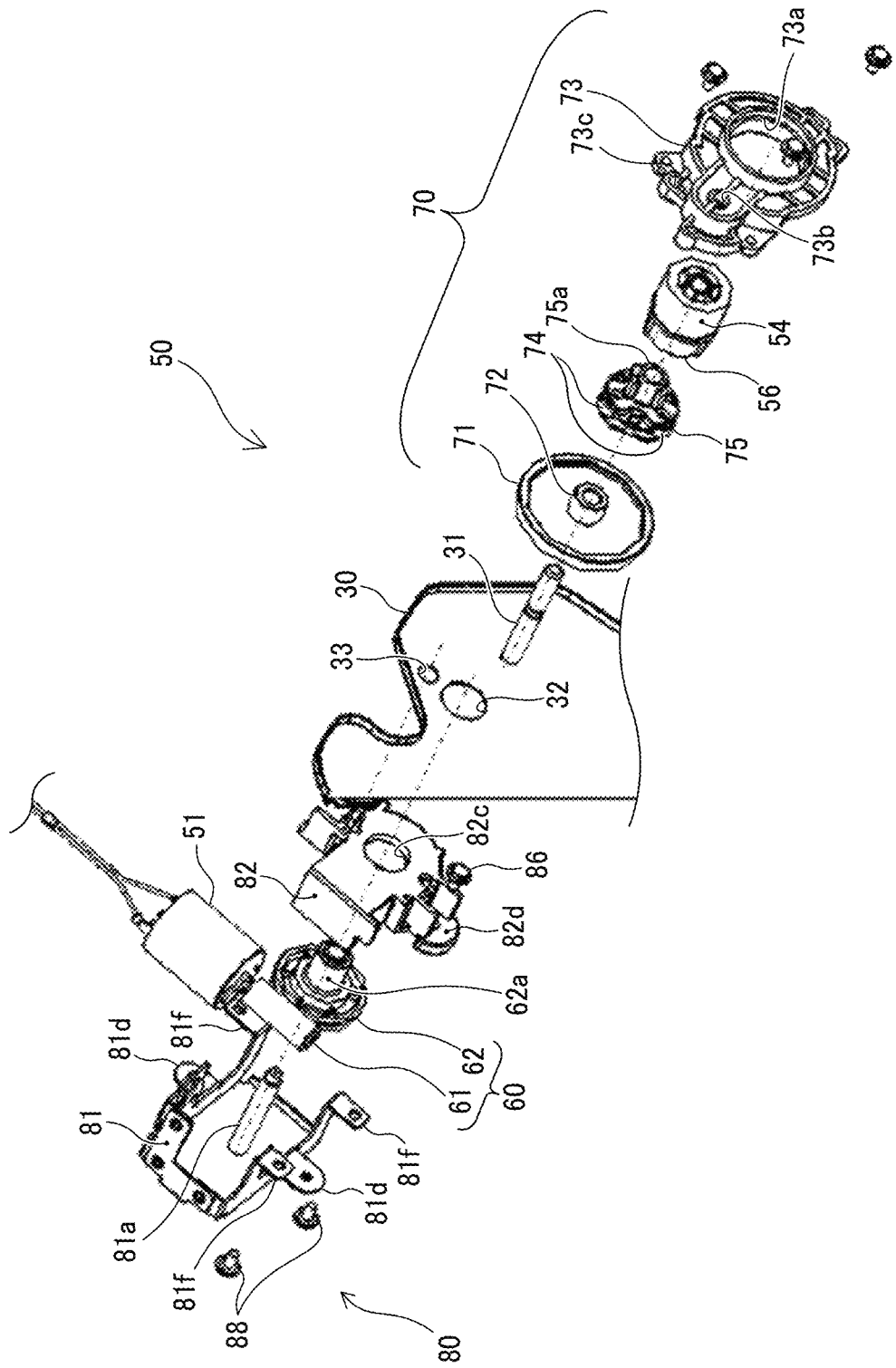
FIG. 8 is an exploded perspective view of the pressure drive device of FIG. 6.

FIG. 8 is an exploded perspective view of the pressure drive device 50 according to the present embodiment.

Figure 9A:
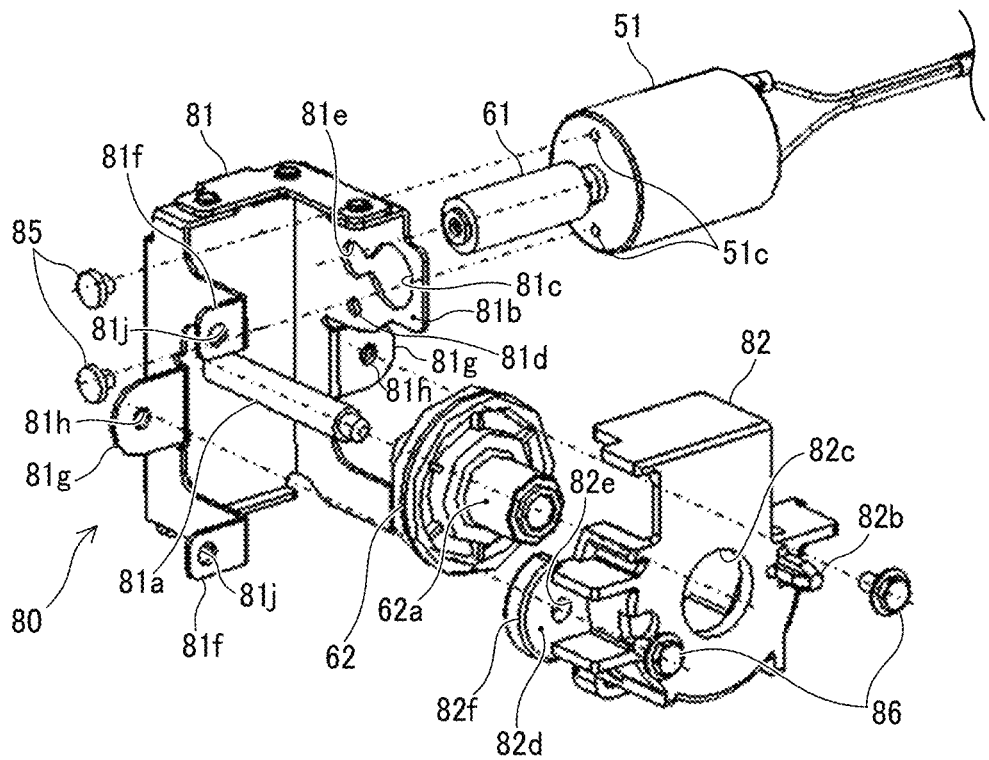
FIGS. 9A and 9B are perspective views of a pressure motor unit according to an embodiment of the present disclosure.
Figure 9B:
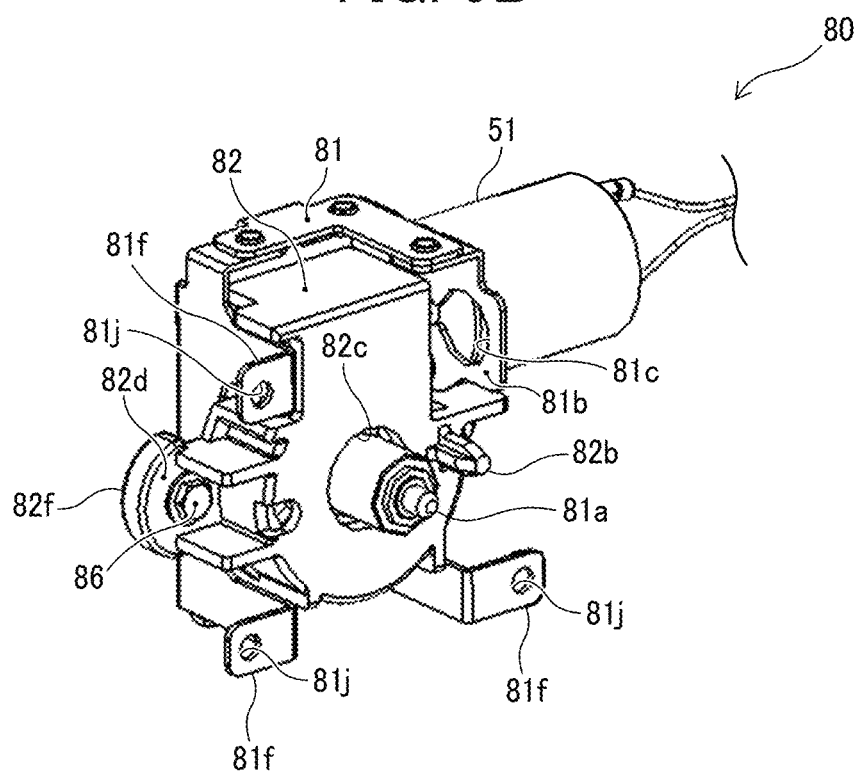

FIGS. 9A and 9B are perspective views of a pressure motor unit 80 according to an embodiment of the present disclosure. More specifically, FIG. 9A is an exploded view of the pressure motor unit 80 and FIG. 9B is a perspective view of the pressure motor unit 80.

Figure 10:
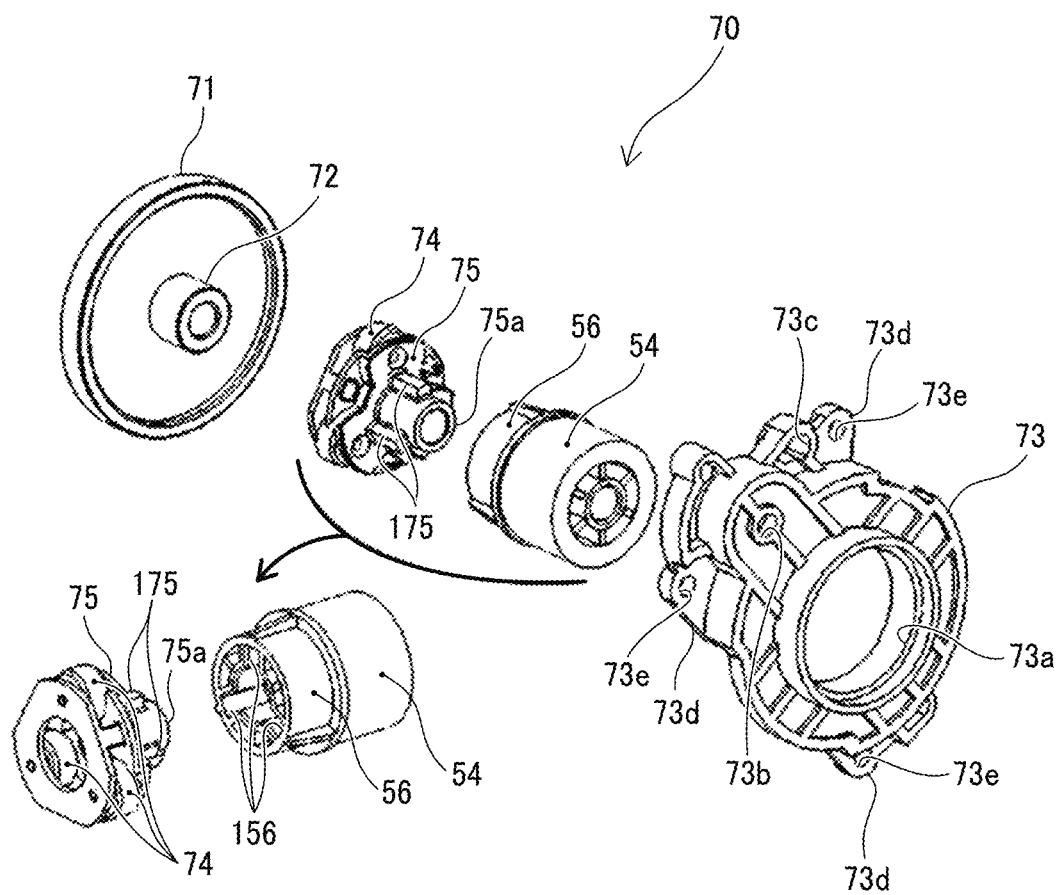
FIG. 10 is an exploded perspective view of a downstream part of a drive train disposed in a space between a drive bracket and a rear panel.

FIG. 10 is an exploded perspective view of the downstream part of the drive train disposed in a space between the drive bracket 30 and a rear panel 100a of the color printer 100.

The drive train that transmits the driving force of the pressure motor 51 of the pressure drive device 50 to the cams 44 includes two speed reducers, which are a worm gear 60 and a planetary gear mechanism 70. The worm gear 60 is disposed on the pressure motor unit 80, and the planetary gear mechanism 70 is disposed on a fixed shaft 31 disposed on the drive bracket 30.

The pressure motor unit 80 is an integrated unit including the worm gear 60 and the pressure motor 51. As illustrated in FIGS. 9A and 9B, the pressure motor unit 80 includes a motor bracket 81 made of sheet metal, and a motor housing 82 made of resin material and screwed to the motor bracket 81.

The pressure motor 51 is a brush motor smaller and less expensive than a brushless motor and is held by the motor bracket 81. To be specific, as illustrated in FIGS. 9A and 9B, the motor bracket 81 has a motor support face 81b extending orthogonal to the motor shaft. The motor support face 81b has a shaft insertion hole 81c and a motor shaft engagement hole 81e. The motor shaft of the pressure motor 51 to which a worm 61 is attached is inserted into the shaft insertion hole 81c. The motor shaft engagement hole 81e is joined with the shaft insertion hole 81c. Two screw through holes 81d are formed in the motor support face 81b across the motor shaft engagement hole 81e. The screws 85 that are used to fix the pressure motor 51 with screw pass through the screw through holes 81d. Two screw holes 51c are formed in the face of the pressure motor 51 facing the motor support face 81b, with the motor shaft provided in between.

The worm 61 of the pressure motor 51 is attached to the motor shaft of the pressure motor 51. The motor shaft of the pressure motor 51 is inserted into the shaft insertion hole 81c. When the worm 61 passes through the shaft insertion hole 81c, the pressure motor 51 is slid to the far side of FIG. 9A to engage the motor shaft with the motor shaft engagement hole 81e. Then, the screws 85 that have passed through the screw through holes 81d of the motor support face 81b are inserted into the screw holes 51c of the pressure motor 51, so that the pressure motor 51 is fastened to the motor bracket 81.

A housing fixing portion 81g to which the motor housing 82 is fastened is provided substantially at the center in the vertical direction on both sides of the motor bracket 81 in the direction of rotation axis (i.e., the left-right direction in FIG. 9) of the pressure motor 51. A screw hole 81h is formed in the center of each housing fixing portion 81g. The motor bracket 81 has three unit fastening portions 81f for fastening the pressure motor unit 80 to the drive bracket 30. Each of the unit fastening portions 81f has a screw through hole 81j at the center, so that the screw 88 (see FIG. 6) passes through the screw through hole 81j. Two of 0 the three unit fastening portions 81f are provided at the lower portions on both sides of the motor bracket 81 along the rotational axis of the pressure motor 51, and the remaining one of the three unit fastening portions 81f is provided near the upper portion on a side opposite to the motor support face 81b in the direction of rotation axis. The screws 88 are inserted through the three unit fastening portions 81f to insert the screws 88 into the screw holes of the 5 drive bracket 30, so that the pressure motor unit 80 is fixed to the drive bracket 30 (see FIG. 6).

The worm gear 60 includes the worm 61 and a worm wheel 62. The worm 61 is attached to the motor shaft to rotate together with the motor shaft of the pressure motor 51.

The worm wheel 62 is meshed with the worm 61 and is rotatably supported by a support shaft 81a that is fixed to the motor bracket 81. The worm wheel 62 has a first coupling gear 62a that is meshed with a second coupling gear 71 of the downstream drive train of the drive bracket 30 in the drive transmission direction. The downstream drive train of the drive bracket 30 is disposed near the fixing device 10. The first coupling gear 62a passes through the through hole 32 of the drive bracket 30. The distal end of the first coupling gear 62a protrudes into the space between the drive bracket 30 and the internal gear housing 73, so that the protruding portion (i.e., the distal end) of the first coupling gear 62a is to mesh with the second coupling gear 71 (see FIG. 6).

The motor housing 82 is made of resin material and has a through hole 82c through which the first coupling gear 62a passes. The motor housing 82 is provided with a positioning projection 82b serving as a positioning object to position the pressure motor unit 80. The positioning projection 82b passes through a through hole 33 of the drive bracket 30 and is fitted into a second positioning hole 73c serving as a positioning portion of the internal gear housing 73 serving as a unit positioning member. The motor housing 82 is provided with attachment portions 82d at both axial ends of the motor shaft, at substantially the center in the vertical direction of the motor housing 82. Each of the attachment portions 82d is provided with a screw through hole 82e at the center, so that a screw 86 passes through the screw through hole 82e. In addition, the attachment portion 82d on the left side of the motor housing 82 in FIGS. 9A and 9B has a cover 82f that covers the housing fixing portion 81g of the motor bracket 81.

The screw 86 is inserted through the screw through hole 82e of each attachment portion 82d to insert the screw 86 into the screw hole 81h of the housing fixing portion 81g of the motor bracket 81. By so doing, the motor housing 82 is fastened to the motor bracket 81. As a result, the worm gear 60 is contained in the motor housing 82 and the motor bracket 81.

The planetary gear mechanism 70 includes a sun gear 72, a carrier 75, three planetary gears 74, and an internal gear 73a. The sun gear 72 is mounted on the second coupling gear 71. The three planetary gears 74 are rotatably supported by the carrier 75 and are meshed with the sun gear 72. The internal gear 73a is mounted on the internal gear housing 73 and is meshed with the planetary gears 74. The sun gear 72 and the carrier 75 constituting the planetary gear mechanism 70 are rotatably supported by the fixed shaft 31 disposed on the drive bracket 30. The internal gear housing 73 serving as a unit positioning member including the internal gear 73a is supported by the fixed shaft 31 via the planetary gears 74 and the sun gear 72. Further, the output gear 54 to which the driving force is transmitted from the planetary gear mechanism 70 is also rotatably supported by the fixed shaft 31. As described above, the whole components disposed between the drive bracket 30 of the pressure drive device 50 and the rear panel 100a are supported by the fixed shaft 31.

The carrier 75 has a cylindrical support object portion 75a to be supported by the fixed shaft 31, as illustrated in FIGS. 8 and 10. Three drive coupling projections 175 are disposed on the outer circumferential surface of the support object portion 75a, at equal intervals having an angle of 120 degrees. The drive coupling projections 175 are drivingly coupled to the output gear 54. On the other hand, the output gear 54 is provided with a tubular portion 56 into which the support object portion 75a is inserted. Three grooves 156 to which the drive coupling projections 175 are fitted are disposed on the inner circumferential surface of the tubular portion 56 of the output gear 54, at equal intervals having an angle of 120 degrees. As the drive coupling projections 175 are fitted to the grooves 156, the driving force is transmitted from the carrier 75 to the output gear 54.

In the planetary gear mechanism 70 according to the present embodiment, the sun gear 72 is the input, the internal gear 73a is fixed, and the carrier 75 is the output. By setting the sun gear 72 as the input, the internal gear 73a being fixed, and the carrier 75 as the output, the planetary gear mechanism 70 can obtain the maximum reduction ratio, in other words, a greatest reduction ratio of the combination of the input, the fixed, and the output.

The internal gear housing 73 having the internal gear 73a has a plurality of bracket fixing portions 73d to be fixed to the drive bracket 30. Screw through holes 73e are formed in the bracket fixing portions 73d, so that the screws 78 pass through the screw through holes 73e. As the screws 78 pass through the screw through holes 73e so that the screws 78 are inserted into the screw holes formed in the drive bracket 30, the internal gear housing 73 is screwed to the drive bracket 30. The internal gear housing 73 is fastened to the drive bracket 30 while the internal gear 73a of the internal gear housing 73 is meshed with the planetary gears 74 that is meshed with the sun gear 72 and the internal gear housing 73 is supported by the fixed shaft 31.

Further, the internal gear housing 73 has a first positioning hole 73b and the second positioning hole 73c, each serving as a positioning portion for positioning the pressure motor unit 80. The first positioning hole 73b is formed in the internal gear housing 73 at a position away from the drive bracket 30, as illustrated in FIG. 6. The first positioning hole 73b is a round opening serving as a primary reference for positioning, and the second positioning hole 73c is a slot serving as a secondary reference for positioning.

The distal end 181 of the support shaft 81a serving as a positioning object of the pressure motor unit 80 is fitted to the first positioning hole 73b and the distal end of the positioning projection 82b serving as a positioning object of the pressure motor unit 80 is fitted to the second positioning hole 73c. By so doing, the pressure motor unit 80 is positioned to the internal gear housing 73. The pressure motor unit 80 is positioned to the internal gear housing 73 and is then fastened to the drive bracket 30.

As described above, in the present embodiment, the pressure motor unit 80 is positioned to the internal gear housing 73 that is supported by the fixed shaft 31. By so doing, the second coupling gear 71 that is supported by the fixed shaft 31 and the first coupling gear 62a of the pressure motor unit 80 can be preferably meshed with each other. As a result, the driving force of the pressure driving can be preferably transmitted to the cams 44. In particular, in the present embodiment, the support shaft 81a that is attached to the pressure motor unit 80 and rotatably supports the first coupling gear 62a is used as a positioning shaft to position the pressure motor unit 80 to the internal gear housing 73 that is supported by the fixed shaft 31 that supports the second coupling gear 71. As a result, the relation of positions of the support shaft 81a and the fixed shaft 31 can be determined accurately, and the first coupling gear 62a supported by the support shaft 81a and the second coupling gear 71 supported by the fixed shaft 31 can be meshed with high accuracy.

In the present embodiment, the first positioning hole 73b serving as a primary reference for positioning is provided at a position away from the drive bracket 30. As a result, the following effective configuration can be achieved. More specifically, when the pressure motor unit 80 is positioned to the internal gear housing 73, the pressure motor unit 80 can be supported at three points, which are the first positioning hole 73b, the through hole 32 of the drive bracket 30, and the second positioning hole 73c. Due to such a configuration, the pressure motor unit 80 can be temporarily held by the drive bracket 30 and the internal gear housing 73. As a result, after completion of the positioning of the pressure motor unit 80 to the internal gear housing 73, the pressure motor unit 80 can fastened to the drive bracket 30 without holding the pressure motor unit 80 by hand, and the fastening operability can be enhanced.

In the above description, the pressure motor unit 80 is provided with the positioning shaft and the positioning hole is provided with the internal gear housing 73. However, the internal gear housing 73 may be provided with the positioning shaft and the pressure motor unit 80 may be provided with the positioning hole, so as to position the pressure motor unit 80 to the internal gear housing 73 on the side of the pressure motor unit 80. With this configuration, by providing one of the two positioning holes of the pressure motor unit 80 away from the drive bracket 30, the pressure motor unit 80 can be temporarily held by the drive bracket 30 and the internal gear housing 73.

In the present embodiment, the drive train of the pressure drive device 50 is divided and arranged inside and outside the apparatus with respect to the drive bracket 30. More specifically, the worm gear 60, which is one of the two speed reducers of the drive train, is disposed outside the apparatus with respect to the drive bracket 30. Due to such a configuration, the pressure drive device 50 can be disposed by effectively utilizing the space between the drive bracket 30 and the rear panel 100a of the image forming apparatus, where the sheet ejection drive train 22 and the fixing drive train 23 of the fixed-sheet ejection drive device 20 are disposed, and the space between the drive bracket 30 and the exterior cover of the color printer 100 (image forming apparatus), where the fixed-sheet ejection motor 21 (see FIG. 11) is disposed. As a result, the pressure drive device 50 having a plurality of speed reducers in the drive train can be disposed without increasing the size of the image forming apparatus.

Further, the pressure motor 51 and the worm gear 60 are integrated as a single unit as the pressure motor unit 80. As a result, the assemblability to the image forming apparatus is more enhanced when compared with a configuration in which the pressure motor 51 and the worm gear 60 are assembled separately to the drive bracket 30.

Further, in the present embodiment, even when the noise is generated during the drive transmission of the drive transmitters of the drive train of the pressure drive device 50 disposed on the inner side of the drive bracket 30, the noise can be blocked by the drive bracket 30 and can be prevented from leaking to the outside of the image forming apparatus. As a result, a reduction in noise emission of the image forming apparatus can be achieved.

As the pressure motor 51 rotates, the worm gear 60 reduces the speed of rotation of the pressure motor 51 before the sun gear 72 of the planetary gear mechanism 70 rotates. As the sun gear 72 rotates, the planetary gears 74 that mesh with the sun gear 72 revolve around the sun gear 72 while rotating. Due to the revolution of the planetary gears 74 around the sun gear 72, the carrier 75 rotates, and the output gear 54 that is engaged with the carrier 75 is rotated together with the carrier 75. Then, the driving force is transmitted to the cam gear 55 that is meshed with the output gear 54, so as to rotate the cams 44.

Further, in the present embodiment, a high reduction ratio can be obtained by using two speed reducers, which are the worm gear 60 and the planetary gear mechanism 70. According to this configuration, the speed of rotation of pressure motor 51 can be reduced significantly. Due to such a configuration, the output torque that is output to the cams 44 can be significantly increased with respect to the drive torque of the pressure motor 51. As a result, even when the pressure motor 51 is a motor having a relatively low drive torque is used, the output torque to be output to the cams 44 can be greater than the load torque of the cams 44. Accordingly, even when the pressure motor 51 is a less expensive and compact brush motor having a relatively small drive torque, the pressure motor 51 can rotate the cams 44 preferably, and the pressure force of the pressure roller 19 to the fixing roller 18 can be adjusted. As a result, even when the drive motor to drive the cams 44 different from the drive motor to drive the fixing roller 18 is used, an increase in size of the color printer 100 can be prevented, and an increase in cost of the color printer 100 can be prevented.

When another drive motor is used to drive the cams 44 in addition to the drive motor to drive the fixing roller 18, the following effective configuration can be achieved. More specifically, at the recovery from, for example, the sleep mode, the increase in the pressure force of the pressure roller 19 can be performed at the same time with the operation to rotate the fixing roller 18 to increase the temperature of the fixing roller 18 to a given temperature. As a result, the startup time of the color printer 100 can be reduced.

Further, the worm gear 60 and the planetary gear mechanism 70 are used as the speed reducers, so that a relatively large reduction ratio can be obtained without using a gear having a large diameter. By so doing, when compared with a configuration in which the gear train obtains a large reduction ratio, an increase in size of the image forming apparatus (e.g., the color printer 100) can be prevented.

Further, in the present embodiment, since a high reduction ratio can be obtained, the angle of rotation of the cams 44 to the amount of driving force of the pressure motor 51 can be relatively small. As a result, the angle of rotation of each of the cams 44 can be adjusted finely, and fine adjustment of the pressure force can be performed.

Further, a high reduction ratio can be obtained by using the worm gear 60 and the planetary gear mechanism 70, in other words, two speed reducers. By so doing, the following effects can be achieved. When a top dead center of the cams 44 contacts the cam bearing 42, a distance from the center of the cam shaft 44a of each of the cams 44 to the outer circumferential surface of each of the cams 44 becomes the greatest distance. When the cams 44 are rotated from this state, the biasing force of the springs 43 works on the cams 44 in the rotational direction of the cams 44. As a result, the cams 44 are pressed in the rotational direction by the biasing force of the springs 43 to cause the cams 44 to rotate. However, since the configuration of the present embodiment can obtain a high reduction ratio, a relatively large amount of force is to be applied to rotate the cams 44 on the side of the cams 44. As a result, even when the cams 44 are pressed to the rotational direction by the biasing force of the springs 43, the speed of rotation of the cams 44 does not increase instantly. Accordingly, the cams 44 and the cam bearings 42 do not separate instantly, and the sound of impact that occurs when the cams 44 and the cam bearings 42 contact with each other again can be reduced.

Further, the worm gear 60 is employed in the pressure motor unit 80. According to this configuration, the motor shaft of the pressure motor 51 can be disposed to be parallel to the drive bracket 30. Due to such a configuration, when compared with a configuration in which the motor shaft of the pressure motor 51 is located to be perpendicular to the drive bracket 30, the color printer 100 serving as an image forming apparatus according to the present embodiment can be prevented from increasing in size. As a result, the motor and a part of the drive train can be disposed in the gap between the drive bracket 30 and the exterior cover.

FIG. 11 is a perspective view of the drive bracket 30 as viewed from the side where the pressure motor unit 80 is attached.

Figure 12:
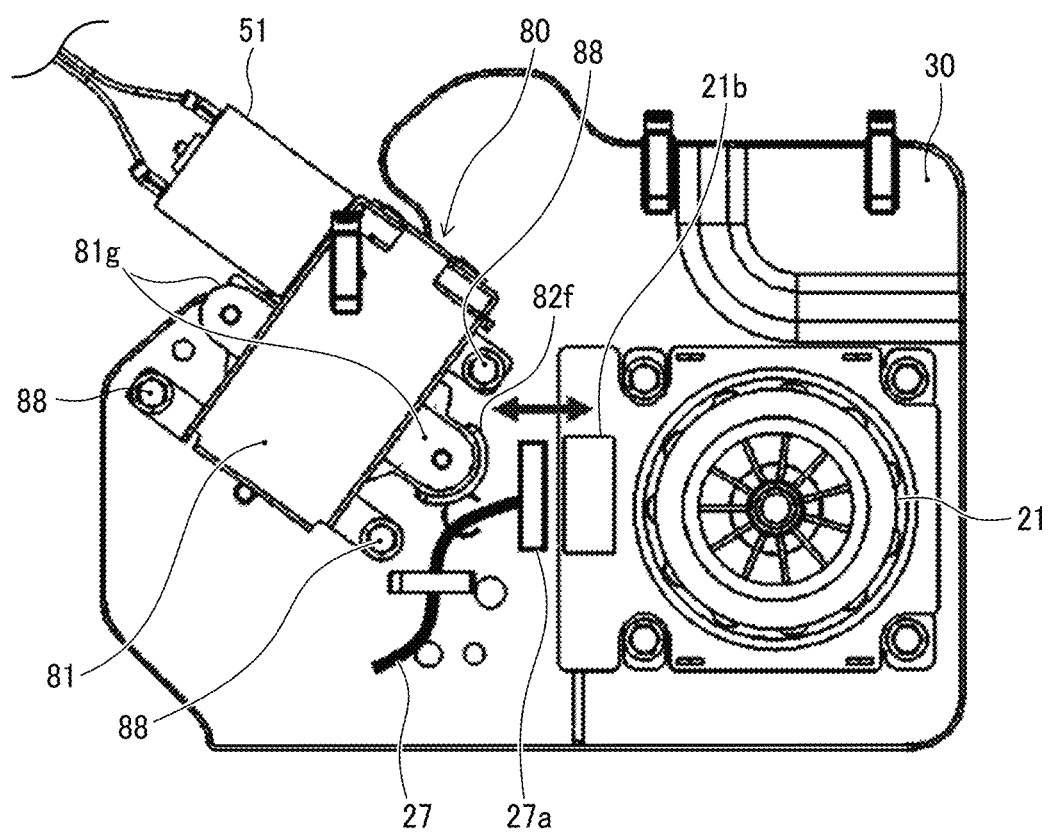
FIG. 12 is a diagram illustrating insertion and removal of a connector to a fixed-sheet ejection motor, according to an embodiment of the present disclosure.

FIG. 12 is a diagram illustrating insertion and removal of a connector 27a to the fixed-sheet ejection motor 21.

As illustrated in FIG. 11, the pressure motor unit 80 is attached to the drive bracket 30 in the vicinity of the fixed-sheet ejection motor 21. The fixed-sheet ejection motor 21 has a connector 21b. A connector 27a of a harness 27 that inputs a signal to the fixed-sheet ejection motor 21 is inserted into the connector 21b. As illustrated in FIG. 12, the housing fixing portion 81g of the motor bracket 81 of the pressure motor unit 80 faces the connector 27b of the fixed-sheet ejection motor 21 in the direction where the connector 27a of the harness 27 is inserted into or removed from the connector 21b of the fixed-sheet ejection motor 21.

During maintenance of the apparatus, as indicated by the arrow in FIG. 12, the connector 27a of the harness 27 may be inserted into or removed from the connector 21b of the fixed-sheet ejection motor 21. If a significantly large force is applied when removing the connector 27a of the harness 27 from the connector 21b of the fixed-sheet ejection motor 21, the operator's hand holding the connector 27a of the harness 27 is likely to hit the housing fixing portion 81g of the motor bracket 81. The motor bracket 81 is made of sheet metal having a thin edge shape. For this reason, when the operator's hand hits the housing fixing portion 81g, the hand may be cut.

To address this inconvenience, in the present embodiment, the pressure motor unit 80 includes the cover 82f that covers the housing fixing portion 81g on the attachment portion 82d of the motor housing 82 made of resin material. Due to such a configuration, when the operator removes the connector 27a of the harness 27, the operator's hand can be protected from hitting the housing fixing portion 81g of the motor bracket 81. In addition, the cover 82f is made of resin material and has an arc shape with no edge. As a result, even if the operator's hand hits the cover 82f when removing the connector 27a of the harness 27, this configuration prevents the operator's hand from being cut.

A description is now given of a pressure drive device 500 according to a modification of the present embodiment.

Figure 13:
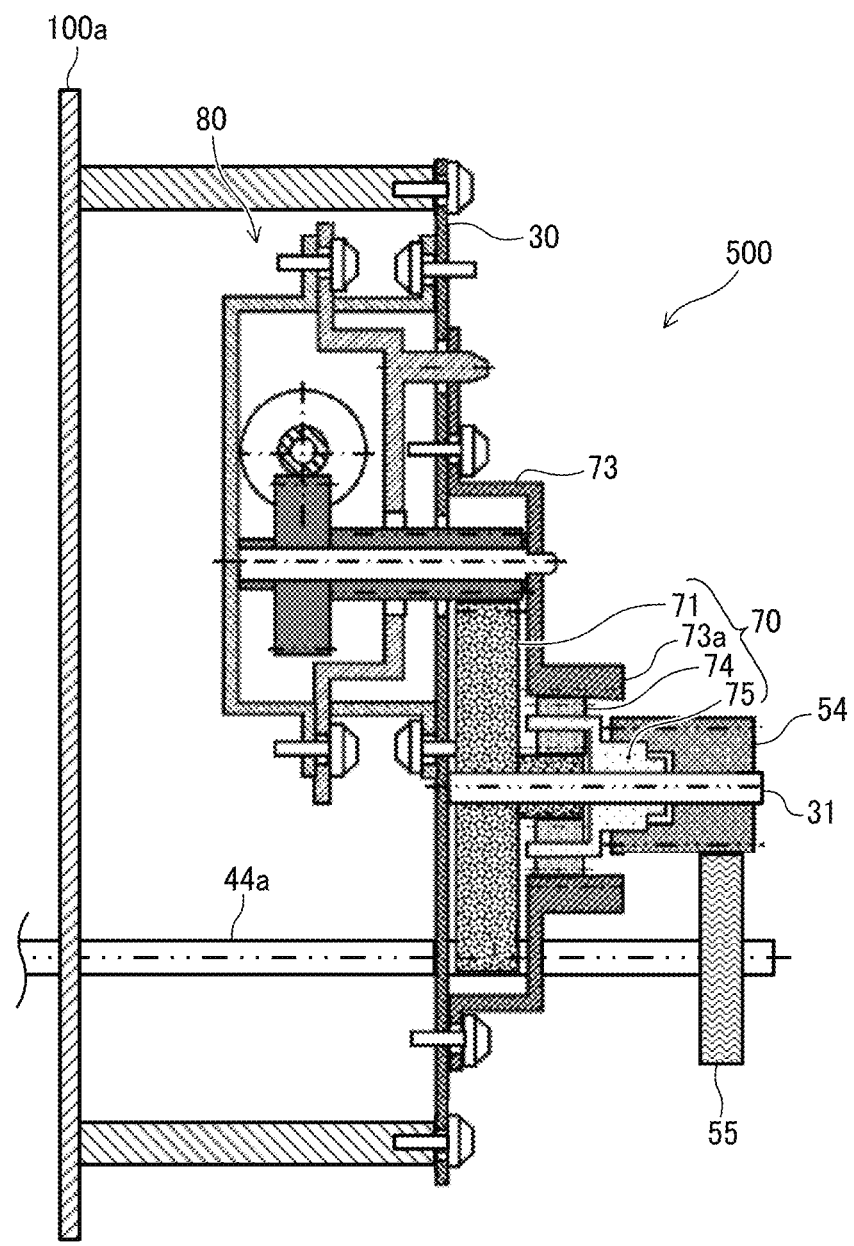
FIG. 13 is a schematic view of the pressure drive device according to a modification of the present embodiment.

FIG. 13 is a schematic view of the pressure drive device 500 according to a modification of the present embodiment.

In the pressure drive device 500 according to the modification, the pressure motor unit 80 is disposed between the drive bracket 30 and the rear panel 100a and the drive transmitters such as the planetary gear mechanism 70 of the downstream drive train in the drive transmission direction is disposed between the drive bracket 30 and the exterior cover.

In this modification, the motor sound of the pressure motor 51 can be blocked by the drive bracket 30 and prevented from leaking to the outside of the apparatus. As a result, a reduction in noise emission of the image forming apparatus can be achieved.

Although specific embodiments are described, the embodiments according to the present disclosure are not limited to those specifically described herein. Several aspects of the drive device and the image forming apparatus are exemplified as follows.

Aspect 1

In Aspect 1, a drive device (for example, the pressure drive device 50) includes a drive source (for example, the pressure motor 51), a drive train including a plurality of drive transmitters (for example, the worm gear 60, the first coupling gear 62a, the second coupling gear 71, the planetary gear mechanism 70, the output gear 54), and a unit positioning member (for example, the first positioning hole 73b, the second positioning hole 73c). The drive train including the plurality of drive transmitters transmits a driving force of the drive source to a driven member (for example, the cams 44). The plurality of drive transmitters include a first group (for example, the worm gear 60, the first coupling gear 62a) and a second group (for example, the second coupling gear 71, the planetary gear mechanism 70, the output gear 54). The drive source and the first group of the drive transmitters together serve as an integrated unit (for example, the pressure motor unit 80) attached to one side of a facing member (for example, the drive bracket 30) facing a side panel (for example, the rear panel 100a) of an image forming apparatus (for example, the color printer 100). The integrated unit includes a positioning object (for example, the support shaft 81a, the positioning projection 82b). The second group (for example, the second coupling gear 71, the planetary gear mechanism 70, the output gear 54) of the drive transmitters is supported by a shaft (for example, the fixed shaft 31) disposed on another side of the facing member. The unit positioning member (for example, the internal gear housing 73) includes a positioning portion (for example, the first positioning hole 73b, the second positioning hole 73c) with which the positioning object is engaged on the one side or said another side of the facing member.

The image forming apparatus is provided with multiple drive devices. These drive devices are typically included in the image forming apparatus as follows. More specifically, the drive source is attached to the face on the other side of the face facing the side panel (for example, the rear panel 100a). The face that faces the side panel of the image forming apparatus serves as a facing member (for example, the drive bracket 30) that faces the side panel of the image forming apparatus. The drive shaft of the drive source is brought to pass through the facing member, so that the drive shaft is placed in the space between the side panel of the image forming apparatus and the facing member. Then, the drive train is disposed in the space that is relatively narrow in the vertical direction to the face of the side panel of the image forming apparatus between the side panel of the image forming apparatus and the facing member.

A certain space is required to dispose a known drive device (for example, the pressure drive device 150) having the drive source and the drive train integrated as a single unit in the image forming apparatus. As a result, depending on the configuration of the image forming apparatus, the known drive device that is integrated as a single unit could not be disposed in the space between the side panel of the image forming apparatus and the counter side panel.

To address this inconvenience, some of the drive transmitters constituting the drive train of the drive device are integrated with the drive source (for example, the pressure motor 51) as a single unit such as the integrated unit (for example, the pressure motor unit 80) and attached to one side of the facing member (for example, the drive bracket 30) and the remaining drive transmitters are attached to the shaft (for example, the fixed shaft 31) on the different side of the facing member. By so doing, the drive train is divided into two. Since the drive transmitters of the drive train that are placed out of the space between the facing member and the side panel of the image forming apparatus are disposed in the space across the facing member from the side panel of the image forming apparatus, the drive device that includes multiple speed reducers such as a worm gear and a planetary gear mechanism in the drive train can be disposed in the image forming apparatus. However, positional deviation occurred between the drive transmitters attached to the integrated unit and the drive transmitters supported by the shaft of the facing member due to assembly error of the integrated unit to the facing member, and the driving force could not be transmitted preferably.

To remove this inconvenience, the drive device of Aspect 1 includes the unit positioning member (for example, the internal gear housing 73) for positioning the integrated unit. The unit positioning member is supported by the shaft supporting the remaining drive transmitters such as the second group of the drive transmitters. The unit positioning member is supported by the shaft supporting the remaining drive transmitters and the integrated unit is positioned to the unit positioning member that is supported by the shaft. By so doing, the positional accuracy of the remaining drive transmitters supported by the shaft and the drive transmitters disposed on the integrated unit can be enhanced. As a result, the driving force can be preferably transmitted from the drive transmitters on the integrated unit to the drive transmitters supported by the shaft of the drive bracket.

Aspect 2

In Aspect 1, the drive train includes a plurality of speed reducers (for example, the worm gear 60 and the planetary gear mechanism 70 in the present embodiment) to reduce a rotational speed of the drive source (for example, pressure motor 51).

According to this configuration, as described in the embodiments above, the reduction ratio of the drive train can be significantly enhanced and the speed of rotation of the drive source (for example, the pressure motor 51) can be reduced. Due to such a configuration, the output torque that is output to the drive transmission object (for example, the cams 44) can be significantly increased to the drive torque of the drive source. As a result, even when the drive source is a motor having a relatively low drive torque, the desirable output torque can be obtained. Even when the torque to rotate the drive transmission object is relatively high, the drive transmission object can be preferably rotated.

Aspect 3

In Aspect 2, the plurality of speed reducers are a worm gear (for example, the worm gear 60) and a planetary gear mechanism (for example, the planetary gear mechanism 70).

According to this configuration, as described in the embodiments above, a relatively large reduction ratio can be obtained without a gear having a relatively large diameter, and an increase in size of the image forming apparatus can be prevented.

Aspect 4

In Aspect 3, the integrated unit (for example, the pressure motor unit 80) includes the worm gear (for example, the worm gear 60).

According to this configuration, as described in the embodiments above, the drive source (for example, the pressure motor 51) can be disposed so that the motor shaft of the drive source is parallel to the unit attachment face of the facing member (for example, the drive bracket 30). Accordingly, when compared with a configuration in which the motor shaft of the drive source located to be perpendicular to the unit attachment face of the facing member, the image forming apparatus can be prevented from increasing in size in the axial direction.

Aspect 5

In any one of Aspects 3 or 4, the shaft (for example, the fixed shaft 31) supports the planetary gear mechanism (for example, the planetary gear mechanism 70), and the unit positioning member (for example, the internal gear housing 73) has an internal gear (for example, the internal gear 73a) of the planetary gear mechanism.

According to this configuration, as described in the embodiments above, the unit positioning member (for example, the internal gear housing 73) is supported by the shaft (for example, the fixed shaft 31) via the planetary gears (for example, the planetary gears 74) and the sun gear (for example, the sun gear 72) of the planetary gear mechanism (for example, the planetary gear mechanism 70).

Aspect 6

In any one of Aspects 1 to 5, one of the positioning object and the positioning portion is a positioning shaft through which the facing member (for example, the drive bracket 30) passes and a different one of the positioning object and the positioning portion is a positioning hole through which the positioning shaft is fitted. The positioning hole is spaced apart from the facing member in the axial direction of the facing member.

According to this configuration, as described in the embodiments above, the integrated unit (for example, the pressure motor unit 80) can be temporarily held by the positioning hole (for example, the first positioning hole 73b) and the facing member (for example, the drive bracket 30). Accordingly, the integrated unit can be attached to the facing member such as the drive bracket 30, and the assemblability of the integrated unit can be enhanced.

Aspect 7

In any one of Aspects 1 to 6, the positioning object is a support shaft that passes through the facing member (for example, the drive bracket 30) and supports at least one of the drive transmitters (for example, the worm wheel 62 and the first coupling gear 62a). The positioning portion is a positioning hole (for example, the first positioning hole 73b) into which the support shaft is fitted.

According to this configuration, as described in the embodiments above, the relation of positions of the support shaft (for example, the support shaft 81a) and the shaft (for example, the fixed shaft 31) of the facing member (for example, the drive bracket 30) can be determined accurately, and the driving force can be preferably transmitted from the drive transmitters on the integrated unit to the drive transmitters in the space between the facing member such as the drive bracket 30 and the side panel such as the rear panel 100a.

Aspect 8

In any one of Aspects 1 to 7, the one side of the facing member (for example, the drive bracket 30) is outside the image forming apparatus (for example, the color printer 100) with respect to the facing member.

According to this configuration, as described in the embodiments above, the maintenance of the drive source (for example, the pressure motor 51) can be performed easily. In addition, the facing member (for example, the drive bracket 30) can block the noise emission from the drive transmitters supported by the shaft (for example, the fixed shaft 31).

Aspect 9

In any one of Aspects 1 to 7, the one side of the facing member (for example, the drive bracket 30) is inside the image forming apparatus (for example, the color printer 100) with respect to the facing member.

According to this configuration, as described in the modification, the facing member (for example, the drive bracket 30) can block the noise emission from the drive source (for example, the pressure motor 51).

Aspect 10

In Aspects 1 to 9, the driven member (for example, the cams 44) is a cam to change a position of a pressure member (for example, the pressure roller 19) between a pressing position at which the pressure member presses a pressing object (for example, the fixing roller 18) and a non-pressing position at which the pressure member does not press the pressing object.

According to this configuration, as described in the embodiments above, the drive device (for example, the pressure drive device 50) can be disposed without interfering with the facing member (for example, the drive bracket 30) of another drive device (for example, the fixed-sheet ejection drive device 20) that rotates the pressed member (for example, the fixing roller 18).

Aspect 11

In Aspect 11, an image forming apparatus (for example, the color printer 100) includes the drive device (for example, the pressure drive device 50) of any one of Aspects 1 to 10.

According to this configuration, an increase in size of the image forming apparatus can be prevented.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

What is claimed is:

1. A drive device comprising:
   a drive source;
   a drive train including a plurality of drive transmitters configured to transmit a driving force of the drive source to a driven member, the plurality of drive transmitters including a first group of the drive transmitters and a second group of the drive transmitters,
   the drive source and the first group of the drive transmitters together serving as an integrated unit attached to one side of a facing member facing a side panel of an image forming apparatus, the integrated unit including a positioning object,
   the second group of the drive transmitters being supported by a shaft disposed on another side of the facing member; and
   a unit positioning member including a positioning portion with which the positioning object is engaged on the one side or said another side of the facing member.

2. The drive device according to claim 1,
   wherein the drive train includes a plurality of speed reducers to reduce a rotational speed of the drive source.

3. The drive device according to claim 2,
   wherein the plurality of speed reducers are a worm gear and a planetary gear mechanism.

4. The drive device according to claim 3,
   wherein the integrated unit includes the worm gear.

5. The drive device according to claim 3,
   wherein the shaft supports the planetary gear mechanism, and
   wherein the unit positioning member has internal gear of the planetary gear mechanism.

6. The drive device according to claim 1,
   wherein one of the positioning object and the positioning portion is a positioning shaft through which the facing member passes and a different one of the positioning object and the positioning portion is a positioning hole through which the positioning shaft is fitted, and
   wherein the positioning hole is spaced apart from the facing member in an axial direction of the facing member.

7. The drive device according to claim 1,
   wherein the positioning object is a support shaft that passes through the facing member and supports at least one of the drive transmitters, and
   wherein the positioning portion is a positioning hole into which the support shaft is fitted.

8. The drive device according to claim 1,
   wherein the one side of the facing member is outside the image forming apparatus with respect to the facing member.

9. The drive device according to claim 1,
   wherein the one side of the facing member is inside the image forming apparatus with respect to the facing member.

10. The drive device according to claim 1,
    wherein the driven member is a cam to change a position of a pressure member between a pressing position at which the pressure member presses a pressing object and a non-pressing position at which the pressure member does not press the pressing object.

11. An image forming apparatus comprising the drive device according to claim 1.

* * * * *